United States Patent [19]

Murray et al.

[11] Patent Number: 5,018,816
[45] Date of Patent: May 28, 1991

[54] OPTICAL DELAY SWITCH AND VARIABLE DELAY SYSTEM

[75] Inventors: Dale D. Murray, Mount Joy; Paul R. Reitz, Palmyra, both of Pa.

[73] Assignee: AMP Incorporated, Harrisburg, Pa.

[21] Appl. No.: 536,147

[22] Filed: Jun. 11, 1990

[51] Int. Cl.$^5$ .............................................. G02B 6/36
[52] U.S. Cl. ................... 350/96.2; 350/96.15; 350/96.18
[58] Field of Search ............... 350/96.13, 96.15, 96.16, 350/96.18, 96.2

[56] References Cited

U.S. PATENT DOCUMENTS

| | | | |
|---|---|---|---|
| 4,671,605 | 6/1987 | Soref | 350/96.15/14 |
| 4,834,488 | 5/1989 | Lee | 350/96.20 |
| 4,854,660 | 8/1989 | Gutterman et al. | 350/96.18 |

FOREIGN PATENT DOCUMENTS

| | | | |
|---|---|---|---|
| 0299604 | 1/1989 | European Pat. Off. | |
| 2441860 | 7/1980 | France | 350/96.15 |
| 55-10305 | 8/1980 | Japan | 350/96.18 |

*Primary Examiner*—Frank Gonzalez
*Assistant Examiner*—John Ngo

[57] ABSTRACT

An optical fiber switch 9 comprises a group of optical fiber end faces 1, 2, 3, 4, 5, 6, including a first optical fiber end face 1 via which light is transmitted as an input signal and at least second and third optical end faces 2, 3 being the end faces of an optical loop 13. The group further includes a fourth fiber end face 4 via which light is transmitted as an output signal, and fifth and sixth fiber end faces 5, 6 being the end faces of an optical fiber loop 14. In a first position, light from the first fiber end face 1 is imaged into the second fiber end face 2 and is propagated through the fiber loop 13 to the third fiber end face 3 and imaged into the fourth fiber end face 4. In the second position, light from the first fiber end face 1 is imaged into the fifth fiber end face 5 and propagated through the fiber loop 14 through the sixth fiber end face 6 and imaged into the second fiber end face 2. Further, a fiber optic variable discrete delay system for electrical system includes one or more of the optical fiber switches 9 comprising a group of optical fiber end faces 1, 2, 3, 4, 5, 6 and means 8 for displacing the group of end faces 1, 2, 3, 4, 5, 6 relative to one another.

20 Claims, 2 Drawing Sheets

OPTICAL DELAY SWITCH AND VARIABLE DELAY SYSTEM

FIELD OF THE INVENTION

The present invention relates to an optical fiber switch for providing a fiber optic discretely variable delay system.

BACKGROUND OF THE INVENTION

In communication and control systems, delay lines are used to store a signal for a discrete period, and to supply that signal at an output point at the end of the period. This period between the time the signal is input and the time the signal is output is called delay time. Fiber optic switches, particularly for multi-mode fibers, are known as useful devices as delay lines. For example, transversal filters capable of selectively filtering modulated light signals are known. These filters are constructed by helically wrapping a single fiber optic element around a series of v-grooves in a silicon chip with taps at each groove. A problem with these types of delays is that once the devices are constructed, no adjustment of the delay line lengths may be made and, hence, once constructed, the frequency versus attenuation and, consequently, the delay characteristic, as set, is unalterable. Desirable would be a fiber optic discretely variable delay line capable of providing an incrementally adjustable delay to an optical transmission system. With coupling of such fiber optic discretely variable delay line, a variable incremental delay could be imparted to a conventional electrical transmission line.

The present invention relates to an optical fiber switch capable of imparting a discrete delay in transmission of an optical signal as compared to the transmission of a base signal. Further, the present invention relates to a fiber optic discretely variable delay line comprising one or more of said switches.

Gutterman, et al, U.S. Pat. No. 4,854,660, relates to a particular type of fiber optic switch based on the imaging property of a spherical reflecting surface such as that disclosed by Kokoshvill, U.S. patent application Ser. No. 053,220, entitled "Fiber Optic Bypass Switch" filed on May 13, 1987, and further identified by priority publication number EP0299604 A1, the contents of this application incorporated into the Gutterman, et al patent by reference. As taught therein, a point source of light slightly displaced from the center of curvature of a spherical reflector is imaged with minimal aberration at a point symmetrically located with respect to the center of curvature. Switches taught by the Kaptron patent application and the Gutterman patent involve rotating a spherical reflector between first and second positions relative to an array of optical fiber end faces. Illustratively, there is an optical fiber end face (T) which terminates a fiber connected to the transmitter of a node and an optical fiber end face (R) which terminates a fiber connected to the receiver of the node. Two additional fiber end faces (I and O) terminate the incoming fiber and the outgoing fiber respectively. There are also two other optical fiber end faces (L1 and L2) which correspond to the first and second ends of a fiber optic loop.

In the first reflector position, the T and O end faces are conjugate (i.e. symmetrically located with respect to the center of curvature) and the I and R end faces are conjugate. Accordingly, light emanating from the input fiber end face (I) is imaged by the spherical reflector into the receiver fiber end face (R) and light emanating from the transmitter fiber end face (T) is imaged into the output fiber end face (O). Thus in its first position, the switch of the present invention can be used to insert a node into a fiber optic network by coupling light from the incoming fiber to the receiver and light from the transmitter into the outgoing fiber.

In the second reflector position, the input and output fiber end faces (I and O) have conjugate locations so that light from the incoming fiber is now imaged by the spherical reflector into the outgoing fiber instead of the receiver so that the node is bypassed. Simultaneously, in the second reflector position, the transmitter fiber end face (T) and the first fiber loop end face (L1) are conjugate and the receiver fiber end face (R) and the second fiber loop end face (L2) are conjugate. Thus, light emanating from the transmitter fiber end face (T) is imaged by the reflector into the first fiber loop end face (L1). This light enters the fiber loop and emerges at the second fiber loop end face (L2). Light emanating from the second fiber loop end face (L2) is imaged by the reflector into the receiver fiber end face (R). Thus the transmitter and receiver are connected to each other by an optical path enabling the bypassed node to be tested. The fiber optic loop used in the testing path between the transmitter and receiver provides a suitable amount of attenuation so that the receiver is not saturated when the node is tested.

The operation of the switch of the above identified patent application may be summarized as follows. Light arrives via a first optical fiber (the incoming optical fiber) and may be imaged by a spherical reflector into a second optical fiber chosen from a plurality of available fibers (the receiver fiber or the outgoing fiber) depending on which of two positions the reflector is pivoted.

The Gutterman, et al patent discloses a type of switch as taught by the Kokoshvill patent application and relates to a switch for selectively coupling optical fibers wherein the switch includes an imaging system, having a symmetry such as a spherical reflector. The switch also includes a group of optical fiber end faces including a first optical fiber end face via which light is transmitted to the imaging system and at least second and third optical fiber end faces. A translation mechanism is provided for linearly translating the imaging system and the fiber end face group relative to one another between two positions. In a first position, the first and second fiber end faces are conjugate with respect to the symmetry of the imaging system so that light from the first fiber is imaged by the imaging system into the second fiber. In a second position, the first and third fiber end faces are conjugate with respect to the symmetry of the imaging system so that light from the first fiber is imaged by the imaging system into the third fiber. Thus, it is possible to switch the light from the first fiber into the second fiber or into the third fiber depending on the position of the linear translation mechanism.

In another embodiment as taught in the Gutterman, et al. patent, the switch comprises the imaging system having a symmetry and a group of six optical fiber end faces. Light is transmitted to the imaging system via the first optical end face and the fourth optical end face. The fifth and sixth optical end faces are the end faces of an optical fiber loop. The switch includes means for linearly translating the group of fiber end faces and the imaging system relative to one another from a first and a second position. In the first position, light from the first fiber end face is imaged into the second fiber end face and light from the third fiber end face is imaged into the second fiber end face and light from the fourth fiber end face is imaged into the third fiber end face. In the second position, light from the first fiber end face is imaged into the third fiber end face and light from the fourth fiber end face is imaged into the fifth fiber end face. The light imaged into the fifth fiber end face is propagated through the fiber loop to the sixth fiber end face and then imaged into the second fiber end face.

In accord with the present invention, it has been found that a double loop system structurally enables a precise and discrete delay to be provided by a switching mechanism utilizing the fundamental principles of the Gutterman, et al. and Kokoshvill references. It has further been found in the present invention that the switches which act as delays as defined by the present invention may advantageously be incorporated into a fiber optic variable discrete delay line wherein a selected combination of switches impart the capability to provide a selected discrete delay in transmission of an optical signal.

Switches of a 2×2 configuration with a single loop are known. However, these switches are unsatisfactory for use in a delay system because of differing attenuation in respective paths. Thus, in one position, say an "off" position, a signal arrives at the switch, passes therethrough and then exits with little comparative attenuation, while a signal arriving at the switch in an "on" position transfers to the fiber optic loop, through the loop and then is transferred to the output fiber with a loss comparatively greater than that as in the first condition. It has been found with the present invention that by providing two loops, regardless of whether the signal passes through the "through" loop or through the "delay" loop, comparative attenuation, i.e. loss, substantially remains constant.

The loops of the switches of the present invention may be formed and carried within the body of the switch as is preferable with either the switch of the Gutterman, et al patent or the switch of the Kokoshvill patent application, or the loop may be formed outside the body of the switch, for example, as with the switch taught by Lee, U.S. Pat. No. 4,834,488. In one embodiment taught by Lee, an optical switching device comprises a first and second fixed optical fiber along with a fiber end, a rotatable member and third and fourth optical fibers and second fiber end attached to the rotatable member. The first and second fiber ends are connected by a fiber loop. The member is rotatable between two switching positions so that when the member is rotated to one position, the third and fourth moveable fibers are substantially optically aligned with the first and second fixed fibers respectively. When the member is rotated to the next switching position, the third moveable fiber is substantially aligned with the second moveable fiber and the fourth moveable fiber is substantially aligned with the first end face and the first moveable fiber is aligned with the second end face. With the modification of the present invention, an additional loop is formed between one of the two of the first and second fibers and one of the two of the third and fourth fibers.

Further, the present invention relates to an optical time delay device for electrical signals such as that taught by Soref, U.S. Pat. No. 4,671,605, which teaches a length dependent optical time delay/filter device for electrical signals comprising a single integrated optical switching circuit and only two optical time delay components being optically connected to each other through a switching circuit. The length dependent optical time delay/filter device includes means interconnected by a single mode optical fiber to the integrated optical switching circuit for receiving an optical input signal and converting the input signal into an optical signal. The optical signal is received a by preselected optical fiber of one optical time delay component and, thereafter, by a preselected fiber of other optical time delay components. The switching circuit determines which preselected fibers the optical signal passes through. The length dependent optical time delay/filter device further includes means for receiving the optical signal as it outputs from the other optical time delay component and for converting the output signal to an electrical signal. The present invention relates to an optical time delay device utilizing the improved optical fiber switches comprising an imaging system and grouping of fiber optic end faces as hereinafter described.

SUMMARY OF THE INVENTION

The present invention is an optical fiber switch comprising a group of optical fiber end faces. The group includes a first optical fiber end face via through which light is transmitted as an input signal and at least second and third optical fiber end faces which are the end faces of an optical fiber loop. Further included in the group is a fourth fiber end face via which light is transmitted as an output signal and fifth and sixth fiber end faces which are the end faces of an optical fiber loop. The switch further includes means for changing the direction of light transmitted as an input signal between a first and a second position. It has been found by use of a combination of two optical fiber loops that, mechanically, the difference in length between the at least two fiber optic loops may be defined so as to provide a discrete delay in transmission of an optical signal as between light transmitted through one loop and light transmitted through the other. Without the use of two loops, the incremental difference in the transmission distances could not effectively be provided.

In a preferred embodiment of the present invention, the optical fiber switch further includes an imaging system having a symmetry. With this embodiment, the means for changing the direction of light transmitted as an input signal between a first position and a second position comprises means for displacing the group of fiber end faces and the imaging system relative to one another between a first and second position. In the first position, light from the first fiber end face is imaged into the second fiber end face and light imaged into the second fiber end face is propagated through the fiber loop to the third fiber end face and imaged into the fourth fiber end face. In the second position, light from the first fiber end face is imaged into the fifth fiber end face and the light is therefrom propagated through the fiber loop to the sixth fiber end face and imaged into the second fiber end face. The difference in length between the at least two fiber loops defines a discrete delay in transmission of an optical signal as between light transmitted through the loop of the fifth and sixth optical end faces to the fourth fiber end face and light transmitted through the loop of the second and third optical end faces to the fourth fiber end face.

In a preferred embodiment, the imaging system is a spherical reflector wherein the fiber end faces are fixed and the displacing means moves the reflector relative to the fiber end faces as taught by the Kokoshvill patent application. The displacing means may further include a permanent magnet mounted on the reflector or reflector base and a solenoid which, when activated, moves the reflector to a second position. In another embodiment, the imaging system may be a spherical reflector which is fixed and the displacing means translates the fiber end faces relative to the reflector as taught by the Gutterman, et al patent. In this instance, the displacing means may further include a permanent magnet mounted on a substrate holding the fiber optic ends and a solenoid which, when activated, moves the substrate along a linear path.

The present invention also relates to a fiber optic variable discrete delay system comprising a delay line having at least one of the optical fiber switches described above. The switches define a discrete delay in transmission of an optical fiber as between light transmitted therethrough the switch in a first position and light transmitted therethrough the switch in at least a second position. Further, the fiber optic variable discrete delay system may comprise a base transmission line and a delay line having two or more optical fiber switches as described above and connected in series. Each of the switches defines a different discrete delay in transmission of an optical signal in a second position from that of each other optical fiber switch. The different discrete delay in transmission may be an incremental discrete delay in transmission of an optical signal of each optical fiber switch from that of each other optical fiber switch.

Finally, the invention relates to an optical time delay device for electrical signals comprising at least one of the optical fiber switches of the present invention in combination with means interconnected to the system for receiving an electrical input signal and converting the electrical input signal into an optical signal, the optical signal being received by the fiber optic variable discrete delay system. Exemplary of the means for converting the electrical input signal into an optical signal is a laser diode in which the electrical input signal is converted into an optical signal. The device further includes means for receiving the optical signal as it outputs from the fiber optic variable discrete delay system and for converting the output optical signal into an electrical signal. Exemplary of the means for receiving the optical signal and converting it into an electrical signal is a conventional optical detector such as a photodiode.

DESCRIPTION OF A PREFERRED EMBODIMENT

Figure 1:
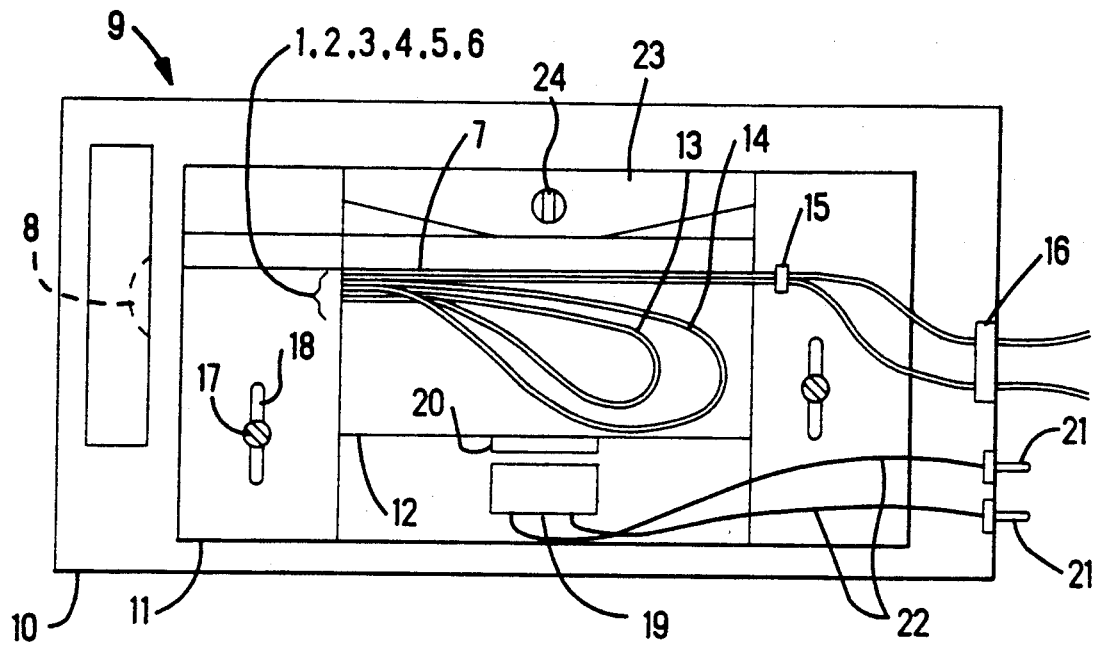
FIG. 1 is a schematic representation of the switch of the present invention.
Figure 2:
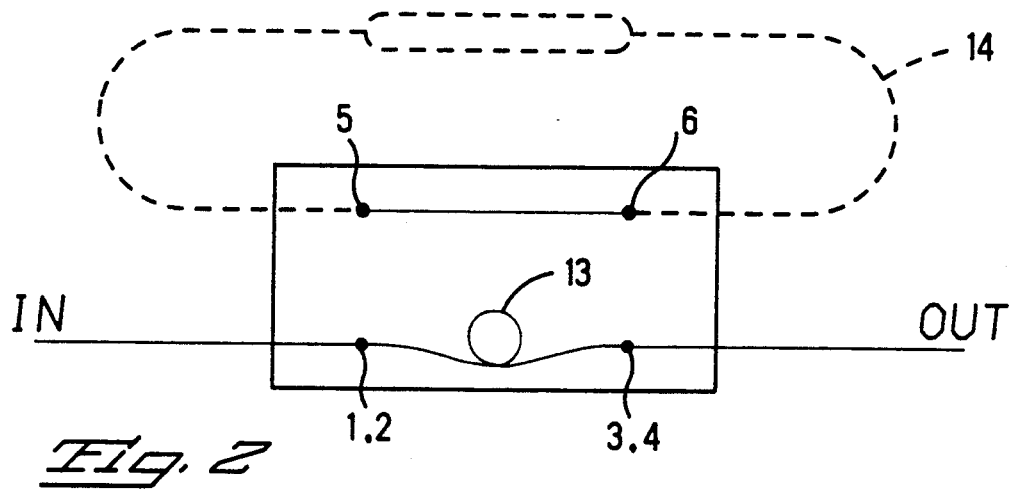
FIG. 2 is a schematic representation of the switching state of a fiber optic switch in accord with the present invention with the switch on an "off" state.
Figure 3:
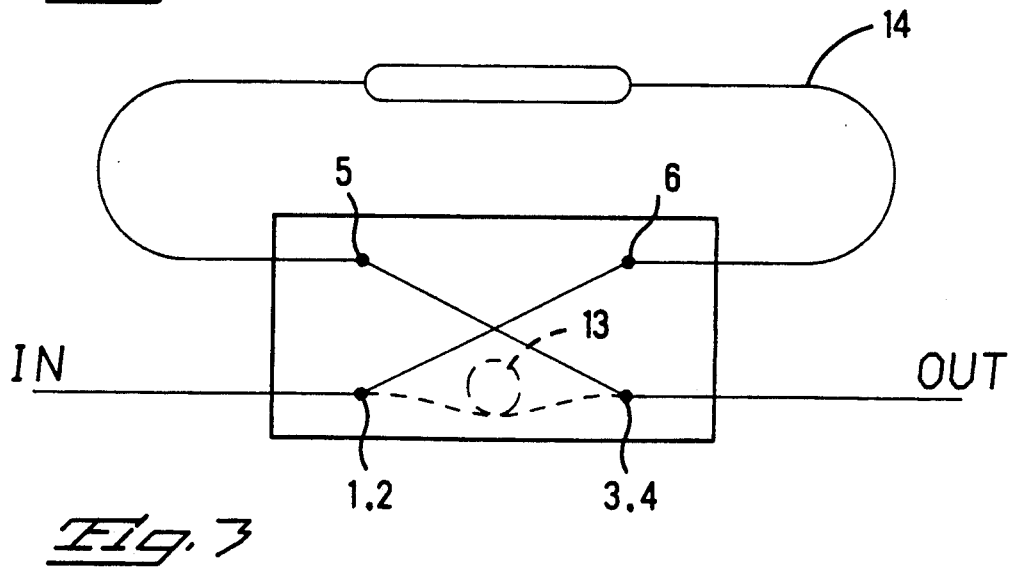
FIG. 3 is a schematic representation of a switching state of the fiber optic switch of the present invention in an "on" state.
Figure 4:
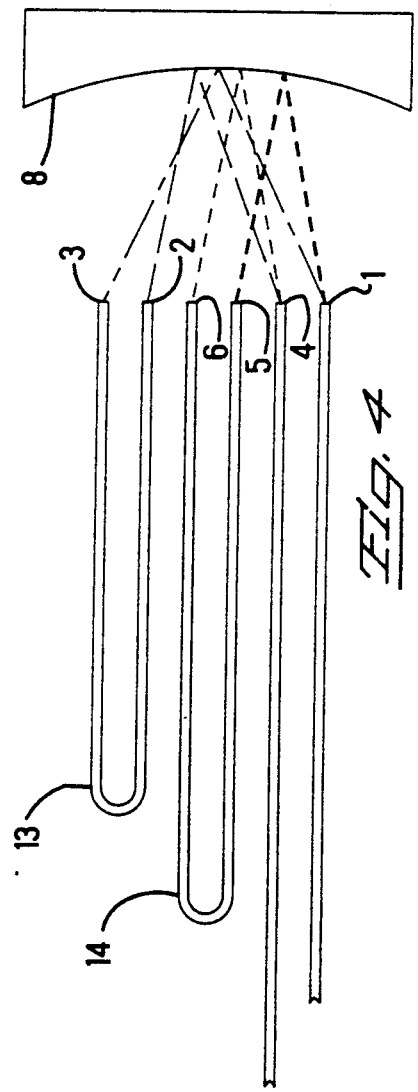
FIG. 4 is a schematic representation of the orientation of the fibers and the spherical reflecting surface which are the major components of the switch of the present invention.

The present invention includes a switch for switching the output of one optical fiber into another optical fiber. The switches encompassed by the present invention are schematically illustrated in FIGS. 1 to 4. FIG. 1 illustrates a switch in which the spherical reflecting surface 8 is fixed and the fiber end faces 1, 2, 3, 4, 5, and 6 are supported by a substrate 12 which is moveable relative to the reflecting surface 8. FIGS. 2 and 3 show switches having at least one fiber optic loop 14 formed by splicing outside of the housing of the switch. The representations of FIGS. 2 and 3 are of a switch such as that of Lee, U.S. Pat. No. 4,834,488, but modified by forming a second loop in accord with the present invention. FIG. 4 of the drawings is a schematic representation of the preferred embodiment of the present invention wherein the fiber optic end faces are fixed on a substrate and the reflector is moveable in accord with the teaching of Kokoshvill but modified with the two loop structure of the present invention. Further, FIG. 4 schematically illustrates the switch of FIG. 1 which is the switch of Gutterman, et al., again modified with a second loop as per the present invention. In the Figures, like elements, as among the various switches, are numbered as identical elements and the description as follows referring to FIGS. 1 and 4 applies to the respective switch depicted.

The switch 9 of FIGS. 1 and 4 comprises a spherical reflecting surface 8. The spherical reflecting surface 8 has the property that a point source of light slightly displaced from the center of curvature of the surface 8 is imaged with minimal aberration at a point symmetrically located with respect to the center of curvature. It is this property of the spherical surface 8 that allows light to be switched selectively from one fiber into another. With respect to the present invention, it should be emphasized that, although the preferred embodiment is shown as involving a spherical mirror 8, any symmetrical reflecting imaging surface or system may be utilized in the switch of the present invention.

A group 7 of six optical fiber end faces is illustrated in the figures. These fiber end faces are labeled 1, 2, 3, 4, 5, 6. For the purpose of clarity, in FIG. 4, the fiber end faces are shown facing out of the plane of the drawing. However, of course, in an actual switch such as that illustrated in FIG. 1, the fiber end faces are oriented toward the spherical mirror.

The group 7 includes six fibers with end faces labeled 1, 2, 3, 4, 5, 6. In one switching mode, fiber end faces 1 and 2 and end faces 3 and 4 have conjugate positions with respect to the center of curvature, and in another switching mode, fiber end faces 1 and 5 and end faces 6 and 2 have conjugate positions with respect to the center of curvature. Accordingly, in a first mode, light emanating from fiber end face 1 is imaged by reflector 8 into fiber end face 2, and light emanating from fiber end face 3 is imaged by the reflector into fiber end face 4. In a second switching mode, the group 7 of fiber end faces and the reflector 8 have been linearly translated relative to one another so that fiber end faces 1 and 5 have conjugate positions with respect to the center of curvature along with fiber end faces 6 and 2. Thus, light emanating from fiber end face 1 is imaged by reflector 8 and through fiber end face 5, and light emanating from fiber end face 6 is imaged by the reflector 8 and through fiber end face 4.

FIG. 1 schematically illustrates an actual embodiment of the switch of FIG. 4. The switch 9 of FIG. 1 comprises a base 10. Fixedly mounted on the base 10 is the spherical reflector 8. The switch 9 also includes a subassembly 11. The ends 1, 2, 3, 4, 5, and 6 (see FIGS. 2, 3, 4) of a group of optical fibers 7 are mounted on a movable substrate 12 which forms part of the subassembly 12. Illustratively, the fiber group includes the fiber loops 13 and 14. The end faces of the fibers are oriented towards the spherical reflector 8 and are arranged with respect to the center of curvature of the spherical reflector 8 so that the spherical reflector 8 provides optical paths between certain fiber pairs. In FIG. 1, the fibers (excluding the loops 13 and 14) are maintained in position by support structures. 15 and 16.

The end faces of the fibers may be polished or cleaved. Polished end faces are provided by a polishing operation to the fiber ends after the ends have been positioned on the substrate 12. The advantage of cleaved end faces is that the fibers are assembled in precisely defined positions on the substrate 12 after the end faces have been cleaved. Particularly, the cleaved end faces of the fiber loops 13 and 14 can be adjusted fore and aft along the axis of the reflector to vary the optical attenuation of an optical signal reflected by the reflector into a cleaved end face of the fiber loop. An end face of the fiber loops 13 and 14 at a position other than at the focal point of the reflector 8 will produce additional attenuation. In addition, end faces of the cleaved fibers can be positioned tangential to an imaginary sphere having the same curvature as the mirror. Polishing the ends of fibers along the same imaginary sphere would be more difficult to achieve than adjusting cleaved ends of fibers in position along the imaginary sphere.

Screws 17 are mounted in the slots 18 and are used for initial alignment of the subassembly 11 with respect to the reflector 12. More particularly, when the screws 17 are loosened, the slots 18 serve as guides for the subassembly 11. Once initial alignment is achieved, i.e. once the subassembly 11 is positioned for a first switching state, the screws 17 are tightened.

To move the switch from a first switching state to a second switching state (i.e. a state in which optical paths are provided between different pairs of fibers than in the first switching state), solenoid 19 and magnet 20 are activated to linearly translate the movable substrate 12. The permanent magnet 20 is mounted to the substrate 12. Illustratively, in the first switching state, the solenoid 19 is off. When the solenoid 19 is activated by way of connectors 21 and leads 22, the magnet 20 is repelled and the subassembly 11 is moved against adjustable stop 23 so that the second switching state is realized. The position of the stop is adjustable by means of screw 24.

With particular reference to FIG. 4, in accord with the present invention, the first optical end face transmits a light signal to the imaging system. The second and third optical end faces are the faces of a first optical fiber loop 13. The fourth end face transmits light away from the imaging system and the fifth and sixth fiber end faces are the end faces of a second optical fiber loop 14. The length of the optical fiber making up the first loop 13 is less than the length of the optical fiber making up the second loop 14. In accord with the present invention, the difference between the lengths of the optical fibers making up the two loops is defined such that light transmitted through the second loop 14 experiences a discrete and defined time delay compared to the light traveling through the said first loop 13.

With particular reference to FIGS. 2, 3 and 4, the switch may be utilized in an "off" state whereby light from the first fiber optic end face 1 is imaged into the second fiber end face 2, the light imaged into the second fiber end face 2 is propagated through the first fiber loop 13 to the third fiber end face 3 and thence imaged into the fourth fiber end face 4. The time required for the light propagated into the first end face 1 and thence imaged into the fourth end face 4 may be said to constitute a base fiber propagation period. In a second position, light from the first fiber end face 1 is imaged into the fifth end face 5 and the light imaged into the fifth fiber end face 5 is propagated through the second fiber loop 14 to the sixth fiber end face 6 and then imaged into the second fiber end face 2. In said second position, the switch is indicated to be "on" and a light signal is caused to be propagated over a loop 14 having a defined length greater than that of the length of the first loop 13. Light propagated through the second loop 14 represents a delayed fiber propagation period as contrasted to the base fiber propagation period. The difference between the delayed fiber propagation period and the base fiber propagation period is defined as a variable discrete delay period. By providing switches characterized by second optical fiber loops 14 between the fifth and sixth fiber end faces 5 and 6 of varying lengths, switches are provided characterized by differing variable discrete delay periods.

Figure 5:
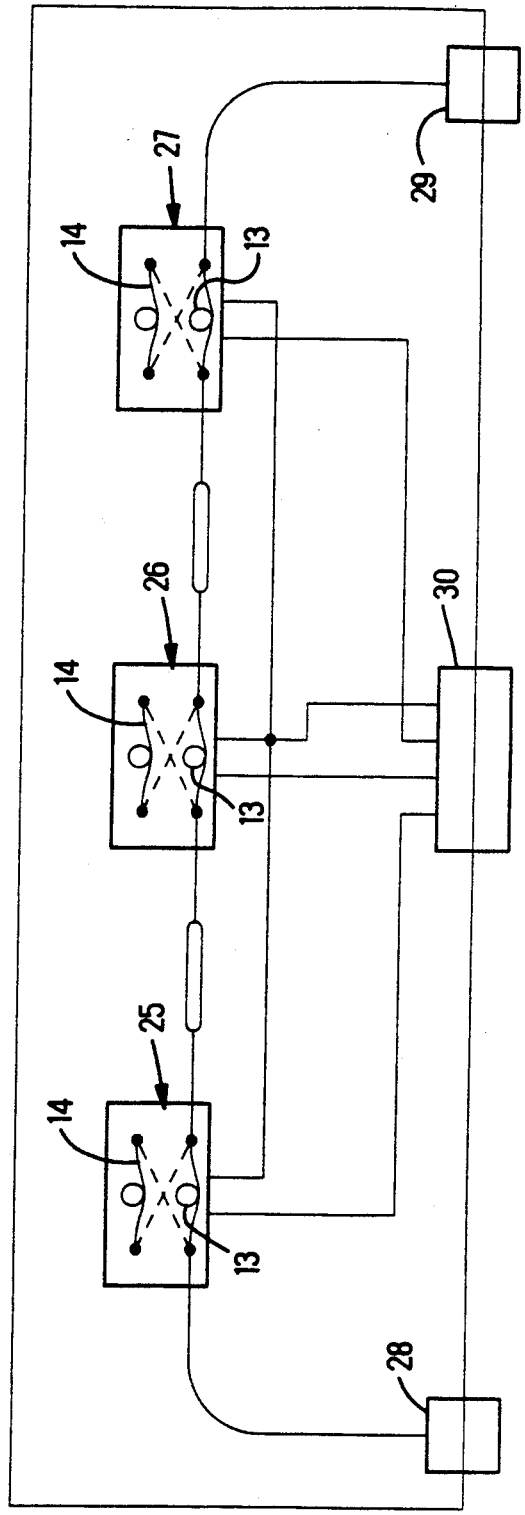
FIG. 5 illustrates a fiber optic variable discrete delay system of the present invention.

With reference to FIG. 5 and in accord with the present invention, switches 25, 26 and 27 characterized by differing variable discrete delay periods may be utilized in a fiber optic variable discrete delay system. With reference to FIG. 5, shown are three optical fiber switches 25, 26 and 27 of the present invention connected in series. Shown also is optical emitter 28 which converts an incoming electrical signal into an optical signal and optical detector 29 which receives an optical signal and converts said signal back into an electrical signal. Conventionally, optical emitter 28 may be a light emitting diode and optical detector 29 may be a suitable conventional photodiode capable of converting the optical signal into an equivalent electrical output signal FIG. 5 shows three switches designated switch 25, switch 26 and switch 27 connected between the optical connector 28 and optical connector 29. Power source 30 provides means for selectively activating switches 24, 25, and 26. In FIG. 5, all switches are shown in an "off" position so that an optical signal passes from optical connector 28 to optical connector 29 along a path of shortest length to provide a base fiber optic propagation period for the system.

In FIG. 5, switch 25 is configured so as to provide a variable discrete delay period of 0.5 n sec as contrasted to the base fiber propagation period of the switch when "off". Switch 26 is configured so as to provide a discrete delay period of 1.0 n sec when activated and switch 27 is configured so as to provide a discrete delay period of 2.0 n sec when activated. In accord with the present invention, by selectively activating the switches 25 through 27, a discrete delay period may be provided of from 0.0 to 3.5 n secs in increments of 0.5 n sec. For example, with reference to the following Table I, with all three switches off, a base fiber propagation period is established. With switch 25 "on", switch 26 "off" and switch 27 "off", a discrete delay period of 0.5 n secs is provided. With switch 25 "off", switch 26 "on" and switch 27 "off", 1.0 n secs of delay is provided, and with switch 25 "on", switch 26 "on" and switch 27 "off", 1.5 n secs of delay is provided. As may be noted from the table, by varying the combination of switches in a "on" and "off" state, a variable delay period from a base delay of 0.0 to 3.5 n secs of delay in increments of 0.5 n secs may be provided.

TABLE I

| Switch #25 | Switch #26 | Switch #27 | Delay |
|---|---|---|---|
| Off | Off | Off | |
| On | Off | Off | 0.5 |
| Off | On | Off | 1.0 |
| On | On | Off | 1.5 |
| Off | Off | On | 2.0 |
| On | Off | On | 2.5 |
| Off | On | On | 3.0 |
| On | On | On | 3.5 |

While what has been described constitutes a presently preferred embodiment, it should be recognized that various other embodiments are within the scope of the present invention. For example, the variable discrete delay system is shown in FIG. 5 as comprising three switches, each having a incremental delay varying from each other switch. The present invention comprises other numbers and combination of switches. Further, the present invention encompasses switches of the same discrete delays or differing in discrete delays from one another in increments other than those shown in FIG. 5. For example, switch 25 could well have a delay of 1.0, switch 26 of 1.3 and switch 27 of 1.0 as well. Further, switch 25 could be characterized by a potential delay of 1.0 n sec, switch 26 of 2.3 n sec and switch 27 of 1.6 n sec. Further the variable delay system of FIG. 5 could include two switches or even ten such switches and more. Further, it is noted that the variable delay system has been described in terms of a switch which is a two loop optical fiber switch. Again, the present invention encompasses switches of the general types taught by Gutterman, et al., U.S. Pat. No. 4,854,660 and Kokoshvill, U.S. patent application Ser. No. 053,220 priority EP0299604A1, and Lee, U.S. Pat. No. 4,834,488 and other switches so long as they are characterized by the double loop structure and configuration elsewise defined by the claims. Accordingly, it should be understood that the invention is to be limited only insofar as required by the scope of the following claims.

We claim:

1. An optical fiber switch comprising:
   an imaging system having a symmetry;
   a group of optical fiber end faces, including a first optical fiber end face via which light is transmitted as an input signal to said imaging system and at least second and third optical fiber end faces being the end faces of an optical fiber loop, a fourth fiber end face via which light is transmitted away from said imaging system as an output signal, and fifth and sixth fiber end faces being the end faces of an optical fiber loop, the length of said fiber loop with fifth and sixth fiber end faces differing from the length of the fiber loop with second and third fiber end faces; and
   means for changing the direction of light transmitted as an input signal from said first optical fiber end face between a first position and a second position, said means for changing the direction of light comprising means for displacing said group of fiber end faces and said imaging system relative to one another between a first position and a second position;
   in said first position, light from said first fiber end face is imaged into said second fiber end face, said light imaged into said second fiber face being propagated through said fiber loop to said third fiber end face and imaged into said second fiber face being propagated through said fiber loop to said third fiber end face and imaged into said fourth fiber end face; and
   in said second position, light from said first fiber end face is imaged into said fifth fiber end face, said light imaged into said fifth fiber end face being propagated through said fiber loop to said sixth fiber end face and imaged into said second fiber end face.

2. The optical fiber switch of claim 1 wherein the difference in length between the at least two fiber loops defines a discrete delay in transmission of an optical signal as between light transmitted through the loop of said fifth and sixth optical end faces to said fourth fiber end face and light transmitted through the loop of said second and third optical end faces to said fourth fiber end face.

3. The switch of claim 2 wherein said reflector is fixed and said displacing means translates said fiber end faces relative to said reflector.

4. The switch of claim 3 wherein said displacing means comprises guide means defining a straight line path, and a substrate moveable along said path, said group of optical fiber ends terminated by said fiber end faces being mounted on said substrate.

5. The switch of claim 4 wherein said displacing means further includes a permanent magnet mounted on said substrate and a solenoid which, when activated, is adapted, to move said substrate along said path.

6. The switch of claim 2 wherein said fiber end faces are fixed and said displacing means displaces said reflector relative to said fiber end faces.

7. A fiber optic variable discrete delay system comprising a delay line having at least one of the optical fiber switches of claim 2 defining a discrete delay in transmission of an optical fiber as between light transmitted therethrough said switch in a first position and light transmitted therethrough said switch in at least a second position.

8. A fiber optic variable discrete delay system comprising two or more optical fiber switches of claim 2 connected in series in which each of said switches defines a different discrete delay in transmission of an optical signal in said second position from that of each other optical fiber switch.

9. A fiber optic variable discrete delay system of claim 18 wherein the different discrete delay in transmission of an optical signal of each switch is an incremental discrete delay in transmission of an optical signal of each optical fiber switch different from that of each other optical fiber switch.

10. The optical time delay device of claim 2 or 9 wherein said means interconnected to said system for receiving an electrical input signal in converting said electrical input signal into an optical signal is a laser diode and, further, wherein said means for receiving said optical signal as it outputs from said fiber optic variable discrete delay system and for converting the output optical signal into an electrical signal is a photodiode.

11. A fiber optic variable discrete delay system comprising two or more optical fiber switches of claim 4 connected in series in which each of said switches defines a different discrete delay in transmission of an optical signal in said second position from that of each other optical fiber switch.

12. The fiber optic variable discrete delay system of claim 11 wherein the different discrete delay in transmission of an optical signal of each switch is an incremental discrete delay in transmission of an optical signal of each optical fiber switch different from that of each other optical fiber switch.

13. An optical fiber switch comprising:
a group of optical fiber end faces, including a first optical fiber end face via which light is transmitted as an input signal and at least second and third optical fiber end faces being the end faces of an optical fiber loop, a fourth fiber end face via which light is transmitted as an output signal, and fifth and sixth fiber end faces being the end faces of an optical fiber loop, the length of said fiber loop with fifth and sixth fiber end faces differing from the length of the fiber loop with second and third fiber end faces; and
means for changing the direction of light transmitted as an input signal from said first optical fiber end face between a first position and a second position, said means for changing the direction of light comprising means for moving the second and fifth optical fiber end faces between two switching positions, a first position and a second position;
in said first position, light from said first fiber end face is imaged into said second fiber end face, said light imaged into said second fiber face being propagated through said fiber loop to said third fiber end face and imaged into said second fiber face being propagated through said fiber loop to said third fiber end face and imaged into said fourth fiber end face; and
in said second position, light from said first fiber end face is imaged into said fifth fiber end face, said light imaged into said fifth fiber end face being propagated through said fiber loop to said sixth fiber end face and imaged into said second fiber end face.

14. The optical fiber switch of claim 13 wherein the difference in length between the at least two fiber loops defines a discrete delay in transmission of an optical signal as between light transmitted through the loop of said fifth and sixth optical end faces to said fourth fiber end face and light transmitted through the loop of said second and third optical end faces to said fourth fiber end face.

15. An optical time delay device for electrical signals comprising: at least one of the optical fiber switches of claim 4 or 14, means interconnected to at least one of said switches for receiving an electrical input signal and converting said electrical input signal into an optical signal, said optical signal being received by said optical fiber switch; and means for receiving said optical signal as it outputs from said optical fiber switch and for converting said output optical signal into an electrical signal.

16. A fiber optic variable discrete delay system comprising a delay line having at least one optical fiber switch defining a discrete delay in transmission of an optical fiber as between light transmitted therethrough said switch in a first position and light transmitted therethrough said switch in at least a second position, said optical fiber switch comprising:
a group of optical fiber end faces, including a first output signal, and fifth and sixth fiber end faces being the end faces of an optical fiber loop; and
means for changing the direction of light transmitted as an input signal from said first optical fiber end face between a first position and a second position;
in said first position, light from said first fiber end face is imaged into said second fiber end face, said light imaged into said second fiber face being propagated through said fiber loop to said third fiber end face and imaged into said second fiber face being propagated through said fiber loop to said third fiber end face and imaged into said fourth fiber end face; and
in said second position, light from said first fiber end face is imaged into said fifth fiber end face, said light imaged into said fifth fiber end face being propagated through said fiber loop to said sixth fiber end face and imaged into said second fiber end face.

17. A fiber optic variable discrete delay system comprising two or more optical fiber switches connceted in series in which each of said switches defines a different discrete delay in transmission of an optical signal in said second position from that of each other optical fiber switch, said optical fiber switch comprising:
in said first position, light from said first fiber end face is imaged into said second fiber end face, said light imaged into said second fiber face being propagated through said fiber loop to said third fiber end face and imaged into said second fiber face being propagated through said fiber loop to said third fiber end face and imaged into said fourth fiber end face; and
in said second position, light from said first fiber end face is imaged into said fifth fiber end face, said light imaged into said fifth fiber end face being propagated through said fiber loop to said sixth fiber end face and imaged into said second fiber end face.

18. The fiber optic variable discrete delay system of claim 17 wherein the different discrete delay in transmission of an optical signal of each switch is an incremental discrete delay in transmission of an optical signal of each optical fiber switch different from that of each other optical fiber switch.

19. An optical time delay device for electrical signals comprising; at leas tone of the optical fiber switches of claim 2 or 11, means interconnected to at least one of said switches for receiving an electrical input signal and converting said electrical input signal into an optical signal, said optical signal being received by said optical fiber switch; and means for receiving said optical signal as it outputs from said optical fiber switch and for converting said output optical signal into an electrical signal.

20. The optical time delay device of claim 16 or 7 wherein said means interconnected to said system for receiving an electrical input signal in converting said electrical input signal into an optical signal is a laser diode and, further, wherein said means for recieving said optical signal as it outputs from said fiber optic variable discrete delay system and for converting the output optical signal into an electrical signal is a photodiode.

* * * * *